(12) United States Patent
O'Hara

(10) Patent No.: US 10,988,256 B2
(45) Date of Patent: Apr. 27, 2021

(54) AERIAL DISPERSAL SYSTEM FOR CREMATED REMAINS

(71) Applicant: Daniel J. O'Hara, San Francisco, CA (US)

(72) Inventor: Daniel J. O'Hara, San Francisco, CA (US)

( * ) Notice: Subject to any disclaimer, the term of this patent is extended or adjusted under 35 U.S.C. 154(b) by 188 days.

(21) Appl. No.: 15/969,590

(22) Filed: May 2, 2018

(65) Prior Publication Data

US 2019/0337619 A1 Nov. 7, 2019

(51) Int. Cl.
*B64D 1/02* (2006.01)
*B64C 27/00* (2006.01)

(52) U.S. Cl.
CPC ............... *B64D 1/02* (2013.01); *B64C 27/00* (2013.01); *B64C 2201/027* (2013.01); *B64C 2201/108* (2013.01); *B64C 2201/128* (2013.01); *B64C 2201/146* (2013.01)

(58) Field of Classification Search
CPC ........ B64D 1/02; B64D 1/16; B64C 2201/128
See application file for complete search history.

(56) References Cited

U.S. PATENT DOCUMENTS

| | | | | |
|---|---|---|---|---|
| 4,106,704 A | * | 8/1978 | McRoskey | A01C 15/02 222/625 |
| 10,139,007 B1 | * | 11/2018 | Wulf | F16K 31/02 |
| 10,569,877 B2 | * | 2/2020 | Miller | B05B 7/1436 |
| 2019/0001352 A1 | * | 1/2019 | Roy | B05B 3/16 |
| 2019/0037828 A1 | * | 2/2019 | Bennett | A01B 79/02 |

* cited by examiner

*Primary Examiner* — Richard G Davis
(74) *Attorney, Agent, or Firm* — The Law Office of Herbert T. Patty

(57) ABSTRACT

A present invention includes a pneumatic-dispersal aerial system which has a particular utility in connection with providing a device for pneumatically dispersal particulate material. In particular, the present invention includes a containment and dispersal device coupled to an aerial device. The containment and dispersal device comprises a containment unit, dispersal control unit, and a forced-air system. The dispersal control unit is disposed below the containment unit. The dispersal control unit is operable to control the release of material from the containment unit and is normally in a closed position and the dispersal control unit comprises a rotator valve which has a passageway to receive the material from the containment unit. The forced-air system is adjacent to the containment unit and is operable to aid in the removal of the received material from the dispersal control unit. The aerial device is operable to transport the containment and dispersal device.

20 Claims, 3 Drawing Sheets

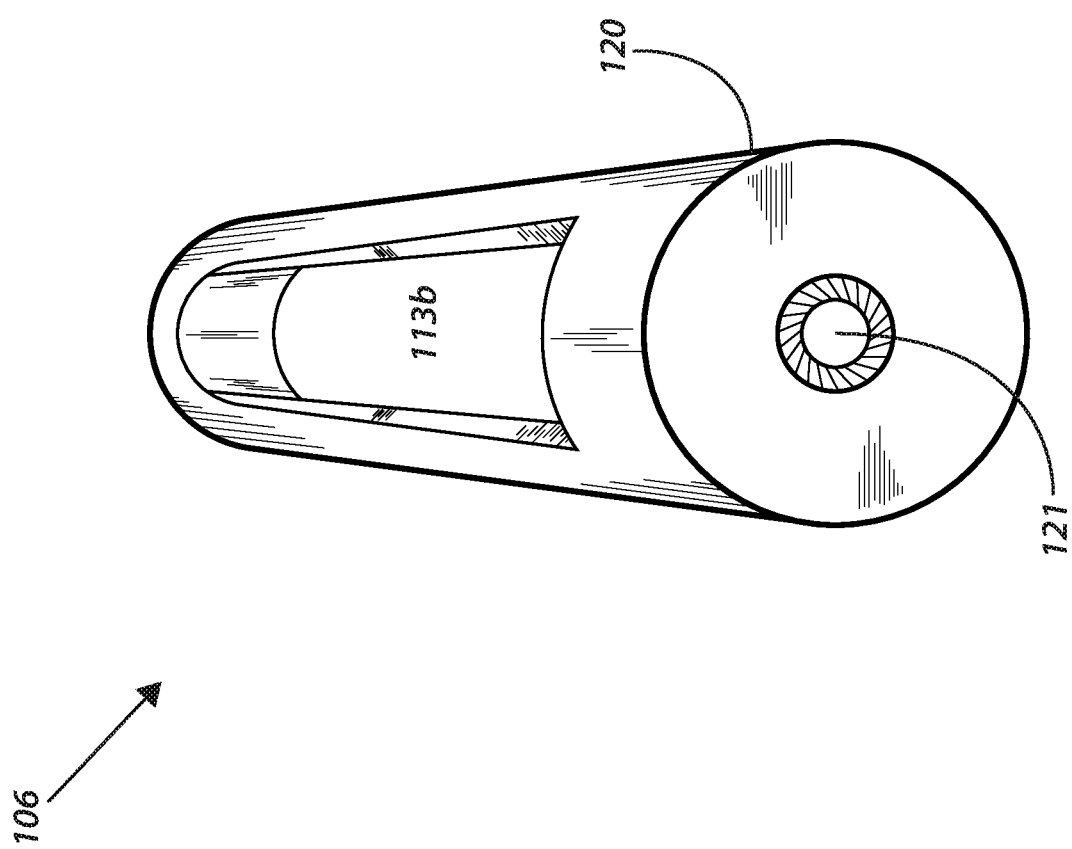

AERIAL DISPERSAL SYSTEM FOR CREMATED REMAINS

FIELD OF THE DISCLOSURE

The present invention describes a system which has a particular utility in connection with providing a device for pneumatically dispersal particulate material. In particular, the present invention is directed to a novel system for dispersal cremated remains.

BACKGROUND OF THE INVENTION

There appears to be an increased acceptance of cremation as a means for treating human remains. There exists any of a number of ways for dealing with the ashes produced by such cremation of human remains. In some instances, the cremated remains may be interred or placed in a columbarium. Additionally, the cremated remains may be returned to a decedent's family or other loved ones for scattering or other forms of disposition.

Various prior art systems disclose manners for dispensing human remains. For example, U.S. Patent Publication 2008/0083102, entitled "Structure and Method for Connecting Cremation Ashes with Living Plants," discloses a device for connecting cremation ashes with a living plant that includes a vessel for holding the cremated remains and a memorial structure connected to the plant positioned in a cavity of the plant. The structure is meant to create a living memorial for the deceased.

U.S. Pat. No. 6,615,463 to Hojaji, entitled "Methods to Solidify Cremation Ash," discloses converting residual bones and ashes from the cremation process of deceased humans and animals into solid objects containing glass, ceramics, clay-based materials, or composites such as materials.

U.S. Pat. No. 5,743,195 to Sucharski, entitled "Apparatus for the Ventilation, Filtration and Collection of Cremated Remains Dust Produced During Processing," discloses an apparatus for comminuting cremation remains that includes a stand having a support for the comminuting apparatus and built in vents which communicate with a blower motor to draw in all of the resulting dust and other contaminants resulting from this process. A series of filters are placed in communication with the vents to trap all pollutants.

U.S. Pat. No. 4,955,548, entitled "Method and Apparatus for Comminuting Cremation Remains," discloses a processing drum having a rotatable comminuting blade driven by a shaft extending into the drum. An ashpan is rotatably positioned so as to move into and out of engagement with the drum for charging the drum with cremation remains for further handling.

It has been observed that when a family member or other loved one is charged with scattering or disposition of the cremated remains the handling of the cremated remains may prove to be an uncomfortable experience. Even so, there appears to be no reliable solution to assist individuals in performing this solemn and often emotional duty.

While any number of devices have been developed that are directed to various aspects of cremation and the treatment of cremated remains, there exists a need for a system that would assist a family member or other individual charged with dispersing cremated remains. The present invention addresses this need.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present invention may readily be understood by considering the following detailed description in conjunction with the accompanying drawings, in which:

FIG. 3 is an illustration of a dispersal control unit component of the pneumatic-dispersal aerial system consistent with one embodiment of the present invention;

DETAILED DESCRIPTION

Before the present invention is described in detail, it is to be understood that, unless otherwise indicated, this disclosure is not limited to specific procedures or articles, whether described or not.

It is further to be understood that the terminology used herein is for the purpose of describing particular embodiments only and is not intended to limit the scope of the present invention.

It must be noted that as used herein, and in the claims, the singular forms "a," and "the" include plural referents unless the context clearly dictates otherwise. Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

The term "about" generally refers to ±10% of a stated value.

A present invention includes a system which has a particular utility in connection with providing a device for pneumatically dispersing particulate material. In particular, a system described herein includes a containment and dispersal device coupled to an aerial device. The containment and dispersal device comprises a containment unit, dispersal control unit, and forced-air system.

In several embodiments, the dispersal control unit may be disposed below the containment unit such that the dispersal control unit is operable to control the release of material from the containment unit. The dispersal control unit may be normally in a closed position. In addition, the dispersal control unit may comprise a rotator valve which has a passageway to receive material from the containment unit. The forced-air system may be adjacent to the containment unit and operable to aid in the removal of material from the containment unit. Notably, the aerial device is operable to transport the containment and dispersal device.

Figure 1:
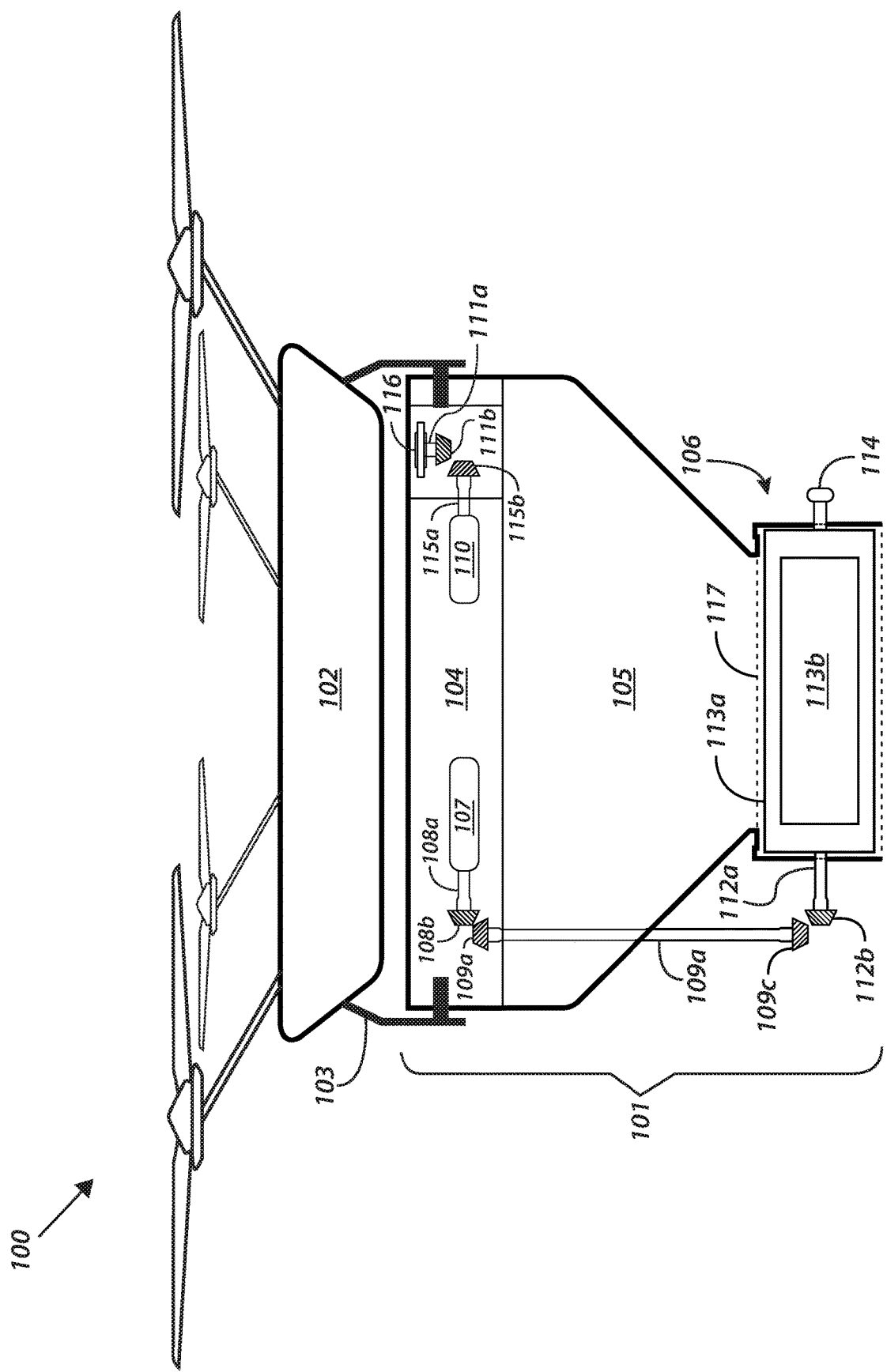
FIG. 1 is an illustration of a pneumatic-dispersal aerial system consistent with one embodiment of the present invention comprising a containment and dispersal unit coupled to an aerial device.

FIG. 1 is an illustration of a pneumatic-dispersal aerial system 100 consistent with the present invention comprising a containment and dispersal unit 101 coupled to an aerial device 102 via attachment apparatus 103. The containment and dispersal unit 101 comprises a containment unit 105 and a dispersal control unit 106. Advantageously, the pneumatic-dispersal aerial system 100 may be employed to spread cremated remains (i.e., ashes) over land or bodies of water.

Containment unit 105 may comprise an upper compartment 104 which contains devices and systems that enable the operation of the pneumatic-dispersal aerial system 100. For example, upper compartment 104 houses a motor 107 which enables, through articulating members 108, 109, 112, the rotation of dispersal control unit 106 to allow material to be removed from the pneumatic-dispersal aerial system 100.

Motor 107 may operate in response to a remote control signal. As shown in the figure, articulating member 108 is coupled to motor 107 and articulating member 109. In several embodiments, several articulating members have a stem-like structure (e.g., 108a, 109a, 111a, 112a, 115a) and an articulating head (e.g., 108b, 109b, 109c, 111b, 112b, 115b). In some embodiments, the articulating heads may be threaded.

Also contained within upper compartment 104 is a motor 110 which can control the operation of forced-air assembly 116 (e.g., fan). As described herein, forced-air assembly 116 can aid in the removal of material from the containment unit. Notably, the aerial device is operable to transport the containment and dispersal device.

The pneumatic-dispersal aerial system 100 may be operated by one or more remote control devices (not shown). For example, the pneumatic-dispersal aerial system 100 can be controlled by a first remote controller that controls flight. However, a second remote controller may be used to control the containment and dispersal unit 101. The first remote controller may be controlled by an individual with a license or one with the requisite training to control aircraft. Contrariwise, the second remote controller may be controlled by any person with basic motor skills to control the dispersal of ashes from the pneumatic-dispersal aerial system 100.

In other embodiments of the present invention, a single remote controller can control both flight and engagement of the dispersal control unit 106. Particularly, one or more remote control functions may be implemented by a smartphone device via a software application installed thereon.

In addition, the pneumatic-dispersal aerial system 100 further comprises a forced-air system 116. In some embodiments, the forced-air system 116 is adjacent to the containment unit 105. In yet other embodiments, the forced-air system 116 is disposed within the containment unit 105. Forced-air system 116 may operates to transfer air directed from outside the containment unit 105 and through the containment unit 105 to lift and carry residual material out of the containment unit 105 through the dispersal control unit 106.

Material stored in the containment unit, such as cremated ashes, may be removed from the pneumatic-dispersal aerial system 100 by way of the dispersal control unit 106 by passing the material from a bottom end opening 117 of the containment unit 105 throughout the dispersal control unit 106. In some embodiments, the dispersal control unit 100 comprises a rotator valve 113a which rotates about a transverse axis defined by articulating member 112 and spindle-type device 114. Notably, dispersal control unit 106 has a passageway 113b such that the material released from the containment unit 105 can traverse therethrough.

The pneumatic-dispersal aerial system may also include several sensors (not shown) which may be relayed to an external system. As such, an operator of the pneumatic-dispersal aerial system 100 may make more informed decisions regarding flight operation and functionality by receiving information obtained from the aerial system's sensors. For instance, the pneumatic-dispersal aerial system 100 may comprise sensors that detect sound, wind speed, altitude, velocity, acceleration, temperature, light intensity, and the like.

The pneumatic-dispersal aerial system 100 may also feature a communications system (not shown) which enables it to receive communications from an external device. Furthermore, the communication system can facilitate communications throughout the pneumatic-dispersal aerial system 100 such that each sub-system can communicate with each other. The communication system may retrieve information obtained by the sensors and relay them to individual components of the pneumatic-dispersal aerial system 100 or to an external device that is communicatively coupled to the aerial system 100.

In some implementations, the pneumatic-dispersal aerial system 100 has a plurality of controls which override a command to enact a particular function. For example, controls may be programmed to only allow the dispersal control unit 106 to engage if the altitude detected by the sensor is below a certain threshold. Furthermore, the controls may be programmed to only allow the dispersal control unit 106 to engage if the velocity detected by the sensors is below a certain speed. As such, the controls in the pneumatic-dispersal aerial system 100 may be configured such that its engagement occurs during acceptable conditions. The controls may be overridden by an administrator with an appropriate authority level.

As provided above, containment device 105 may be configured as any device used to store ashes. Containment device 105 may resemble an urn assembly as urn assemblies are conventionally used to store human remains. Containment device 105 may comprise fiberglass, aluminum, or other lightweight material. However, the present invention is not limited thereto. Containment device 105 may comprise any material that allows the pneumatic-dispersal aerial system 100 to be lightweight and durable.

Containment unit 105 may have a sloped interior surface to deliver the ashes to a passageway of the dispersal control unit 106. In other embodiments, containment unit 105 may have a tapered interior surface to deliver the ashes to a passageway of the dispersal control unit 106. In addition, containment unit 105 may comprise a hatch at a portion (e.g., top portion) thereof through which the ashes can be delivered to the unit 105. In some implementations, the containment unit 105 is detachable.

Containment unit 105 may be configured such that ashes and other material can be transferred therethrough on its way out of the pneumatic-dispersal aerial system 100. In addition, containment unit 105 may comprise a non-stick surface to aid in the dispersal of the material.

Figure 2:
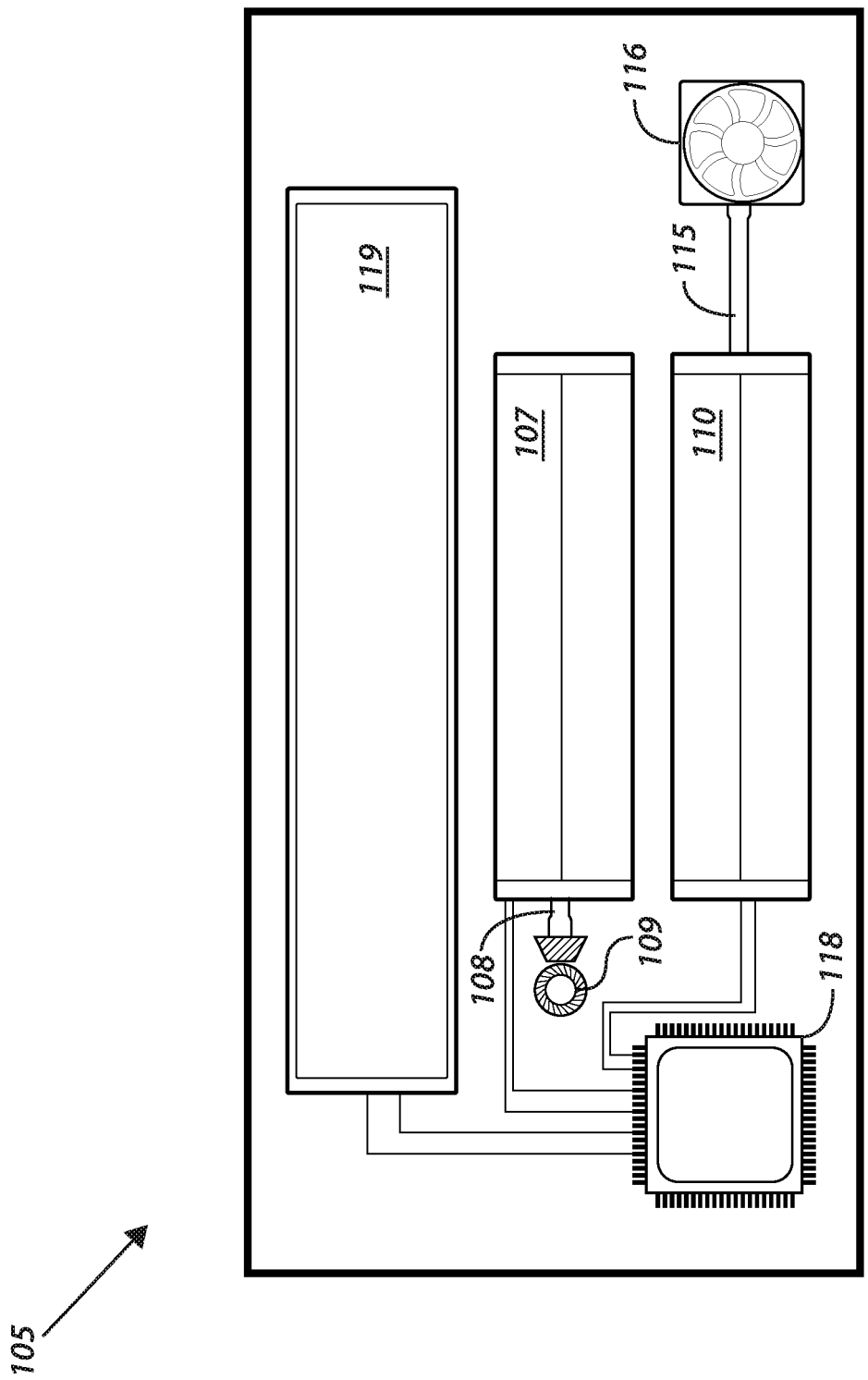
FIG. 2 is an illustration of a top view of a containment device component of a pneumatic-dispersal aerial system consistent with one embodiment of the present invention.

FIG. 2 is an illustration of a top view of an upper compartment of containment device 105 component of a pneumatic-dispersal aerial system consistent with one embodiment of the present invention. The top view exposes several devices that enable the pneumatic-dispersal aerial system to function. In particular, the upper compartment of the containment device 105 includes a central processing unit (CPU) 118 which controls a first motor 110, a second motor 107, and a power source 119. In response to a signal (command), a CPU 118 can engage motor 110 to move articulating member 115 to engage forced-air system 116. Furthermore, a CPU 118 can also engage motor 107 to move articulating member 108 in a manner to engage the dispersal control unit, via other articulating members (e.g., articulating member 109) to release or hold material contained within the containment unit 105.

FIG. 3 is an illustration of a dispersal control unit 300 component of the pneumatic-dispersal aerial system consistent with the present invention. In addition, the dispersal control unit 106 has a passageway 113*b* to receive material from the containment unit. The dispersal control unit 106 can rotate about its transverse axis (e.g., through bore 121). Notably, the dispersal control unit 106 has sections that are open (i.e., passageway 113*b*) and other sections that are solid (e.g., surface 120 of dispersal control unit 106) such that the dispersal of ashes is interrupted intermittently according to design.

The dispersal control unit 106 may be responsive to remote control. For example, a remote controller device may engage the dispersal control unit 106 by causing it to move in a manner such that the ashes within the containment unit is released therefrom and out of the pneumatic-dispersal aerial system.

In some implementations, the dispersal control unit 106 may comprise a set of actuators (not shown) coupled thereto which controls the dispersal control unit's 106 movement. As such, the dispersal control unit 106 may be responsive to operational control. The set of actuators may engage or disengage for a pre-determined time period for a pre-determined number of iterations. For example, the dispersal control unit 106 may be engaged in one second increments for several iterations. Accordingly, in some implementations, there may be enough ashes within the containment unit that more than one person can control the dispersal of ashes from the pneumatic-dispersal aerial system.

In some embodiments, the dispersal control unit 106 is normally disengaged. As such, the dispersal control unit 106 is normally closed such that no ashes are dispersed from the pneumatic-dispersal aerial system unless the dispersal control unit 106 is engaged.

In some embodiments, the dispersal control unit 106 may comprise a motorized hatch opening (not shown). The motorized hatch opening may be responsive to remote control to engage the dispersal control unit to release or contain the ashes, subject to user control.

The dispersal control unit 106 may also include an internal mechanism which creates a dispersement pattern for the ashes as they leave the pneumatic-dispersal aerial system. The dispersement pattern may engender an artistic expression that is appropriate for funeral ceremonies. To accomplish this, the pneumatic-dispersal aerial system may also have to hover in a specific orientation to help create the dispersement pattern.

For instance, the dispersal control unit 106 may disperse the ashes in a manner that the collective ashes resemble a tornado shape. It should be understood by those having ordinary skill in the art that the present invention is not limited to any one pattern of dispersement.

A remote device can initiate (e.g., via commands from an individual user of a remote device) a specific dispersal pattern. Upon this command, the pneumatic-dispersal aerial system can engage the dispersal control unit and effect a specific motion to facilitate the selected dispersement pattern. In some implementations, the pneumatic-dispersal aerial system engages its sensors to determine whether its pre-programmed motion orientation for the selected dispersement pattern needs to be adjusted.

For example, if the wind-speed is in a particular range, the pneumatic dispersal aerial device may adjust its movement orientation according to a predefined algorithm or via an external application which computes coordinates that are sent directly to the aerial system.

As previously stated, one or more remote controllers may be implemented within an external device. For example, a smartphone device that is equipped with a software application installed thereon can implement one or more functions to control the flight and operation of the pneumatic-dispersal aerial system. As such, a pneumatic-dispersal aerial system equipped with a dispersal control unit and a forced-air system may be responsive to external control. In some implementations, one or more actuators are coupled to a dispersal control unit, particularly a rotator valve (if the dispersal control unit is equipped with a rotator valve) and the forced-air system. One having ordinary skill in the art would understand that an actuator is a mover in that a component of a machine that is responsible for moving and controlling a mechanism or system.

A pneumatic-dispersal aerial system consistent with the present invention comprises an aerial device. In some embodiments, the aerial device may be an aircraft piloted via remote control. For example, the aerial device may be designed similarly to an unmanned aerial vehicle (UAV) with a set of attachments to couple a containment and dispersal device thereto. The aerial device may comprise an aircraft body, energy supply, communications module, and other systems and components characteristic of conventional UAV's.

Accordingly, a primary function of the aerial device is to transport the containment and dispersal device such that cremated ashes can be dispersed over land or bodies or water according to remote user control. The aerial device may be equipped with location-tracking capability.

The aerial device is coupled to the containment and dispersal unit by an attachment unit. Attachment unit may be an individual component which is disposed on an external region of the containment and dispersal device. As such, in some implementations, the attachment unit can be assembled as a component of the pneumatic-dispersal aerial system or disassembled into a standalone device. Attachment unit may attach to a bottom surface of the aerial device such that the containment and dispersal device is disposed under the aerial device.

In other embodiments of the present invention, the attachment unit comprises components that are disposed directly on the containment and dispersal device and the aerial device. For instance, in these embodiments, the components directly disposed in the containment and dispersal device mate with the components on the aerial device.

The present invention is directed to a novel system for dispersal cremated remains. It will be understood that the descriptions of some embodiments of the present invention do not limit the various alternative, modified, and equivalent embodiments which may be included within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

What is claimed is:

1. An apparatus, comprising:
a containment unit; and
a dispersal control unit disposed below the containment unit wherein the dispersal control unit is operable to control the release of material received from the containment unit; and
a set of sensors to detect velocity and altitude,
wherein the set of sensors are communicatively coupled to the dispersal control unit such that the velocity and altitude detected by the sensors regulate the operation of the dispersal control unit to release material from the containment unit according to the programmable settings of the dispersal control unit.

2. The apparatus of claim 1 further comprising a forced-air system that is operable to transfer air outside the containment unit and through the containment unit to lift and carry residual material out of the containment unit through the dispersal control unit.

3. The apparatus of claim 2, wherein the forced-air system is adjacent to the containment unit.

4. The apparatus of claim 2, wherein the forced-air system is disposed within the containment unit.

5. The apparatus of claim 1, wherein an attachment unit is operable to couple the containment unit to an external device.

6. The apparatus of claim 1, wherein the dispersal control unit comprises a rotator valve that is disposed adjacent the containment unit and has a passageway to receive material from the containment unit.

7. The apparatus of claim 1, wherein the dispersal control unit is responsive to operational control.

8. The apparatus of claim 1 further comprising a hatch that is at a portion of the containment unit through which the material can be delivered into the containment unit.

9. The apparatus of claim 1, wherein the containment unit has a tapered interior surface to deliver the material to a passageway of the dispersal control unit.

10. The apparatus of claim 1, wherein the containment unit has a sloped interior.

11. The apparatus of claim 1, wherein the dispersal control unit is normally closed.

12. The apparatus of claim 1, wherein the containment unit is detachable.

13. A dispersal aerial system, comprising:
a containment and dispersal device, comprising:
a containment unit;
a dispersal control unit disposed below the containment unit, the dispersal control unit is operable to control the release of material from the containment unit;
wherein the dispersal control unit is normally in a closed position and the dispersal control unit comprises a rotator valve which has a passageway to receive the material from the containment unit;
a forced-air system that is adjacent to the containment unit and is operable to aid in the removal of the received material from the dispersal control unit;
a set of sensors to detect velocity and altitude,
wherein the set of sensors are communicatively coupled to the dispersal control unit such that the velocity and altitude detected by the sensors regulate the operation of the dispersal control unit to release material from the containment unit according to the programmable settings of the dispersal control unit;
an aerial device operable to transport the containment and dispersal device.

14. The dispersal aerial system of claim 13, wherein an interior of the containment unit comprises a smooth surface.

15. The dispersal aerial system of claim 13 further comprising an external device that can control the dispersal control unit and the forced-air system.

16. The dispersal aerial system of claim 15, wherein the external device is a smartphone device having a remote-control software application installed thereon to control the operations of the dispersal control unit.

17. The dispersal aerial system of claim 16, wherein the smartphone device can control the dispersal control unit by way of the remote-control software application.

18. The dispersal aerial system of claim 13 further comprising an attachment unit that is operable to couple the containment unit to the aerial device.

19. The dispersal aerial system of claim 13, wherein the dispersal unit comprises a rotator valve which is operable to rotate about a transverse axis defined by an articulating member and a spindle.

20. The dispersal aerial system of claim 13, wherein the dispersal control unit is operable to release material from the containment unit in a plurality of dispersement patterns.

* * * * *